(12) United States Patent
Ottaway

(10) Patent No.: US 6,622,467 B1
(45) Date of Patent: Sep. 23, 2003

(54) METHOD FOR HARVESTING LETTUCE

(76) Inventor: James Ottaway, P.O. Box 56, Meadow Vista, CA (US) 95722

( * ) Notice: Subject to any disclaimer, the term of this patent is extended or adjusted under 35 U.S.C. 154(b) by 0 days.

(21) Appl. No.: 10/135,197

(22) Filed: Apr. 30, 2002

Related U.S. Application Data

(62) Division of application No. 09/635,120, filed on Aug. 9, 2000, now Pat. No. 6,378,281.

(51) Int. Cl.[7] .............................................. A01D 45/00
(52) U.S. Cl. .................................................... 56/327.1
(58) Field of Search .............................. 56/14.4, 14.5, 56/16.6, 327.1, 328.1, 121.4, DIG. 2, DIG. 8; 171/38, 40, 41, 42

(56) References Cited

U.S. PATENT DOCUMENTS

| | | | |
|---|---|---|---|
| 3,380,234 A | 4/1968 | Garrett | 56/327 |
| 3,380,237 A | 4/1968 | Garrett | 56/327 |
| 3,497,013 A | 2/1970 | Baker | 171/38 |
| 3,632,919 A | 1/1972 | Chatagnier | 200/61.42 |
| 3,731,477 A | 5/1973 | Coon | 56/327 |
| 3,800,518 A | 4/1974 | Baggiolini | 56/327 |
| 3,821,987 A | 7/1974 | Shepardson | 171/61 |
| 3,827,503 A | 8/1974 | Hansen | 171/38 |
| 3,986,561 A | 10/1976 | Bettencourt | 171/14 |
| 4,003,192 A | 1/1977 | Jordan et al. | 56/27.5 |
| 4,067,179 A | 1/1978 | Schneider | 56/297 |
| 4,089,421 A | 5/1978 | Porter | 209/97 |
| 4,091,931 A | 5/1978 | Button, et al. | 209/73 |
| 4,094,238 A | 6/1978 | Striplin | 99/643 |
| 4,136,509 A | 1/1979 | Lenker et al. | 56/327 |
| 4,147,017 A | 4/1979 | Cortopassi et al. | 56/16.5 |
| 4,156,465 A | 5/1979 | Porter | 171/14 |
| 4,166,505 A | 9/1979 | West | 171/1 |
| 4,174,755 A | 11/1979 | Siri | 171/27 |
| 4,175,621 A | 11/1979 | Seem | 171/14 |
| 4,211,061 A | 7/1980 | Richey | 56/327 |
| 4,234,045 A | 11/1980 | Porter | 171/14 |
| 4,262,477 A | 4/1981 | Turold et al. | 56/327 |
| 4,262,750 A | 4/1981 | Merkley et al. | 171/27 |
| 4,267,689 A | 5/1981 | Schneider et al. | 56/53 |
| 4,294,063 A | 10/1981 | Bianchi | 56/16.4 |
| 4,385,702 A | 5/1983 | Lenker et al. | 209/629 |
| 4,519,191 A | 5/1985 | Ledebuhr et al. | 56/331 |
| 4,876,844 A | 10/1989 | Grey | 53/458 |
| 4,965,993 A | 10/1990 | Butler et al. | 56/327 |
| 4,972,662 A | 11/1990 | Korthuis et al. | 56/329 |
| 5,035,109 A | 7/1991 | Van Den Top | 56/327 |
| 5,174,093 A | 12/1992 | Rodriguez | 56/327 |
| 5,310,102 A | 5/1994 | Hougham | 224/267 |
| 5,560,190 A | 10/1996 | Ottaway | 56/327.1 |
| 6,050,073 A | 4/2000 | Nevarez, Sr. | 56/327 |
| 6,378,281 B1 | 4/2002 | Ottaway | 56/14.4 |

*Primary Examiner*—Robert E. Pezzuto
(74) *Attorney, Agent, or Firm*—Garvey, Smith, Nehrbass & Doody, L.L.C.; Charles C. Garvey, Jr.

(57) ABSTRACT

An improved method of harvesting lettuce provide a frame having ground engaging members (eg. wheels, skids, tracks) that enable the frame to move along the rows of lettuce to be harvested. Powered paddles separate each head of lettuce from its stem and root system, thrusting it through the air to a conveyor. A timing arrangement coordinates the paddle actuation with the speed at which each head of lettuce is encountered. As the head is thrust upward, a spray mist emerges from the tip of one paddle and engulfs the cavity that remains after separation from the stem and root. The spray mist can be a liquid and air mixture that contains a desired chemical to prevent discoloration in the area of the "wound" resulting from being torn from the stem and root system.

23 Claims, 10 Drawing Sheets

METHOD FOR HARVESTING LETTUCE

This is a divisional application of application Ser. No. 09/635,120, filed Aug. 9, 2000, now U.S. Pat. No. 6,378, 281.

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to harvesting machines and methods of harvesting and more particularly, to an improved method and apparatus for harvesting heads of lettuce. Even more particularly, the present invention relates to an improved method and apparatus for harvesting lettuce that features a dual paddle and actuator arrangement that quickly separates a head of lettuce from its root and stem, throwing it to a conveyor. In one embodiment, a sensor or manually operated switch initiates a timing sequence to activate the actuator. A pair of pneumatic cylinders actuate the paddles or flippers that are positioned on opposed sides of a head of lettuce to be picked. The paddles move at a speed that is sufficient to separate the head of lettuce from its stem and root, thrusting it above the underlying earth in an arcuate path to a waiting conveyor.

2. General Background of the Invention

Typically, the harvesting of lettuce has been a manual operation. However, some patents have issued for machines that purport to be lettuce harvesters. Early examples of lettuce harvester patents include numbers U.S. Pat. Nos. 3,380,234; 3,380,237 and 3,497,013. Another example of an early patent is U.S. Pat. No. 3,731,477 entitled "Harvester for Headed Vegetables". The '477 patent discloses a high speed lettuce harvesting machine comprising a vehicle adapted to move along vegetable rows to be harvested, a pair of vegetable head-engaging sensing arms mounted on said vehicle, a plurality of sensor belts mounted on said arms, the sensor belts being adapted to be deflected by the circumference of said vegetable head to guide and actuate a cutting blade toward the stem of the vegetable head so as to sever only fully grown heads and to transport them to a conveyor.

U.S. Pat. No. 3,632,919 discloses an apparatus to detect mature heads of lettuce in a cropped row. The apparatus includes a mobile support movable along the row, and a support mounted above row vertically floatable detector unit bearing successively on the heads of lettuce as the support moves, the detector unit including a gauge and detector wheel assembly.

U.S. Pat. Nos. 3,800,518 and 3,827,503 show tractor mounted lettuce harvesters.

An apparatus for removing loose and/or excess leaves from the head of a leafy edible plant is disclosed in U.S. Patent No. 3,821,987 entitled "Lettuce Harvesting Apparatus". The apparatus includes a conveyor means for conveying the head after the stump has been removed therefrom, with the residual stump portion arranged at the bottom of the head and with the sides of the head unencumbered, whereby the outermost excess leaves fall by gravity from the head during transport from a first position to a second position. In one embodiment, the head is supported solely between the parallel vertically-spaced adjacent runs of upper and lower endless conveyor means, the horizontal run being less than the diameter of the head, whereby the removal of the excess leaves is greatly facilitated with the aid of gravity. The second position may be higher than the first position, in which event the adjacent parallel runs of the upper and lower conveyors are inclined to the horizontal, thereby further assisting in leaf removal. In a second embodiment, the head is supported by generally horizontal conveyor means that include a pair of parallel spaced adjacent longitudinal runs between which are arranged selectively operable cutter means for trimming the residual stump portion of a head and thereby effect removal of excess leaves therefrom.

In U.S. Pat. No. 4,094,238, there is provided a lettuce harvester having a positive means for engaging the stems of lettuce to be trimmed whereby the trim cut is caused to take place at right angles to the stem, and the lettuce is left ready for packaging.

The Lenker patent U.S. Pat. No. 4,136,509 discloses an apparatus for harvesting vegetable heads. A sensing means including a pair of parallel, laterally movable, head-engaging units, which are counter-rotated, is fixed to a frame. A cutting means is mounted on the frame and is responsive to the sensing means. The cutting means includes a horizontal knife blade rotatable 180 degree for each head cut. The severed head is removed from the cutting area by a pair of counter-rotating lifter belts.

The Gray patent U.S. Pat. No. 4,876,844 discloses a field crop harvesting, carton packaging and packed carton handling machine, which includes transport means having a front section, central section and a trailing section. The front and trailing sections include a ground engaging means and each include a platform mounted on the ground engaging means. The front platform also includes an area for stacking and supplying non-erected cartons and for erecting non-erected cartons. The central section includes a conveyor support including a central conveyor means and a left and right conveyor means. The left and right conveyor means each include erected carton receiving and supplying means. The left and right conveyor means include a series of carton packing stations as well as a conveyor for moving the packed cartons to a central conveyor. The control conveyor includes a rearwardly moving conveyor for transporting packed cartons rearwardly to the trailing platform. The trailing platform includes an area for receiving, handling and sealing the packed cartons and distributing the sealed cartons. The apparatus also includes the method of harvesting, carton packaging and packed carton handling together with the steps of cleaning the crop and sealing the same in the cartons.

U.S. Pat. No. 5,310,102 is entitled "Apparatus for Field Sleeving of Lettuce and Other Vegetables". The '102 patent discloses a vegetable sleever suitable for field wrapping of vegetables such as leaf lettuce at the time of harvesting in order to prevent shipping damage.

The Ottaway (applicant herein) patent U.S. Pat. No. 5,560,190 is entitled is "Lettuce Harvesting Method and Apparatus to Perform Same". The '190 patent discloses a method for the automated harvesting of headed row crops, including lettuce, optionally leaving at least the crop root in the ground, and an apparatus to practice the method. The present invention provides a methodology to locate crop stems, separate the outer leaves from the head, grip the stem and harvest the head. Gripping the stem is accomplished with at least one pneumatic gripping bladder. Substantially simultaneous to gripping the head, the head is separated from the core and stem. One method to accomplish this separation is by means of a pair of differential pneumatic bladders which frees the head from the core at the center of the head, leaving the core and the outer leaves attached to the stem and root. Alternatively, a second separation method taught herein is the application of a downward force applied to the top of the head by a pneumatic bladder. The two separation schemes may be used conjointly or in the alternative. As a further alternative, the present invention teaches a harvesting method which cuts the stem at the core, leaving the core within the head and the outer leaves attached to the stem and root. After harvesting, a conveyor means removes the produce to a bin or other receptacle.

U.S. Pat. No. 6,050,073 discloses a harvester and method of harvesting leafy vegetables. The disclosed harvester is designed to harvest vegetables which are delicate and are grown in precisely configured beds of either a rectangular or singular width or a double width. A conveyor/cutter assembly is located on one side of the harvester centerline and has a width somewhat exceeding the width of a single width bed. The wheels on each side are separated by somewhat more than the width of a double bed. The driver and engine is located on the other side of the centerline. Such a harvester can cut single width beds, or can cut double width beds by making a first pass in one direction and a second pass in the other direction. An improved single conveyor/cutter assembly is disclosed along with a method of harvesting and processing leafy vegetables to reduce the amount of debris and unwanted material in the harvested leafy vegetables.

BRIEF SUMMARY OF THE INVENTION

The present invention provides an improved method and apparatus for harvesting lettuce, preferably two or more rows at a time. The lettuce harvester of the present invention includes a frame and a plurality of ground engaging supports. One of the supports is a central support that travels between two rows of lettuce during use. This central ground engaging support is preferably an endless belt-type track.

A plurality of paddles are movably supported upon the frame, including preferably a pair of paddles for each row of lettuce to be harvested. The paddles are positioned on opposing sides of a row to be harvested so that two opposed paddles move toward each other and engage the underside of the head of lettuce to be harvested.

A powered linkage is provided for moving the paddles between lower and upper positions. As the paddles travel swiftly from the lower to the upper position, they engage and pick a head of lettuce to be harvested.

In the preferred embodiment, one of the paddles engages the head of lettuce to be harvested before the other paddle engages the head of lettuce. The time for striking the head of lettuce is delayed slightly for the second paddle, causing the head of lettuce to be separated from its root and stem and to be thrust upwardly and laterally in an arcuate path to a conveyor. The "late hit" by the second paddle imparts a lateral travel component to the head of lettuce, sending it toward the conveyor.

An actuator mechanism is provided that moves the paddles at selected time intervals, the actuator operating the powered linkage to move the paddles in a very fast, arcuate path. In the preferred embodiment, the paddles are preferably pivotally attached to the frame.

The paddles move at a speed sufficient to thrust each harvested head of lettuce upwardly a distance above the soil of preferably at least 15 inches and preferably between about 15 and 40 inches.

The lettuce harvester of the present invention can include a deflector that alters the travel path of any head of lettuce that elevates too far after it is picked by the paddles. The deflector can be in the form of an arcuate cage that extends from a position above the paddles to a position above the conveyor.

The apparatus can include a sensor that senses when a head of lettuce is engaged by the machine as it travels forward. The sensor can be a mechanical member carried by the frame that contacts each head of lettuce sequentially as the harvester moves forward.

In the preferred embodiment, the sensor engages each head of lettuce and is deflected away by the head of lettuce. This deflection of the sensor activates a switch that initiates a timing sequence. In this fashion, the sensor determines when the paddles are to be operated in order to harvest each sequentially encountered the next head of lettuce.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 8:
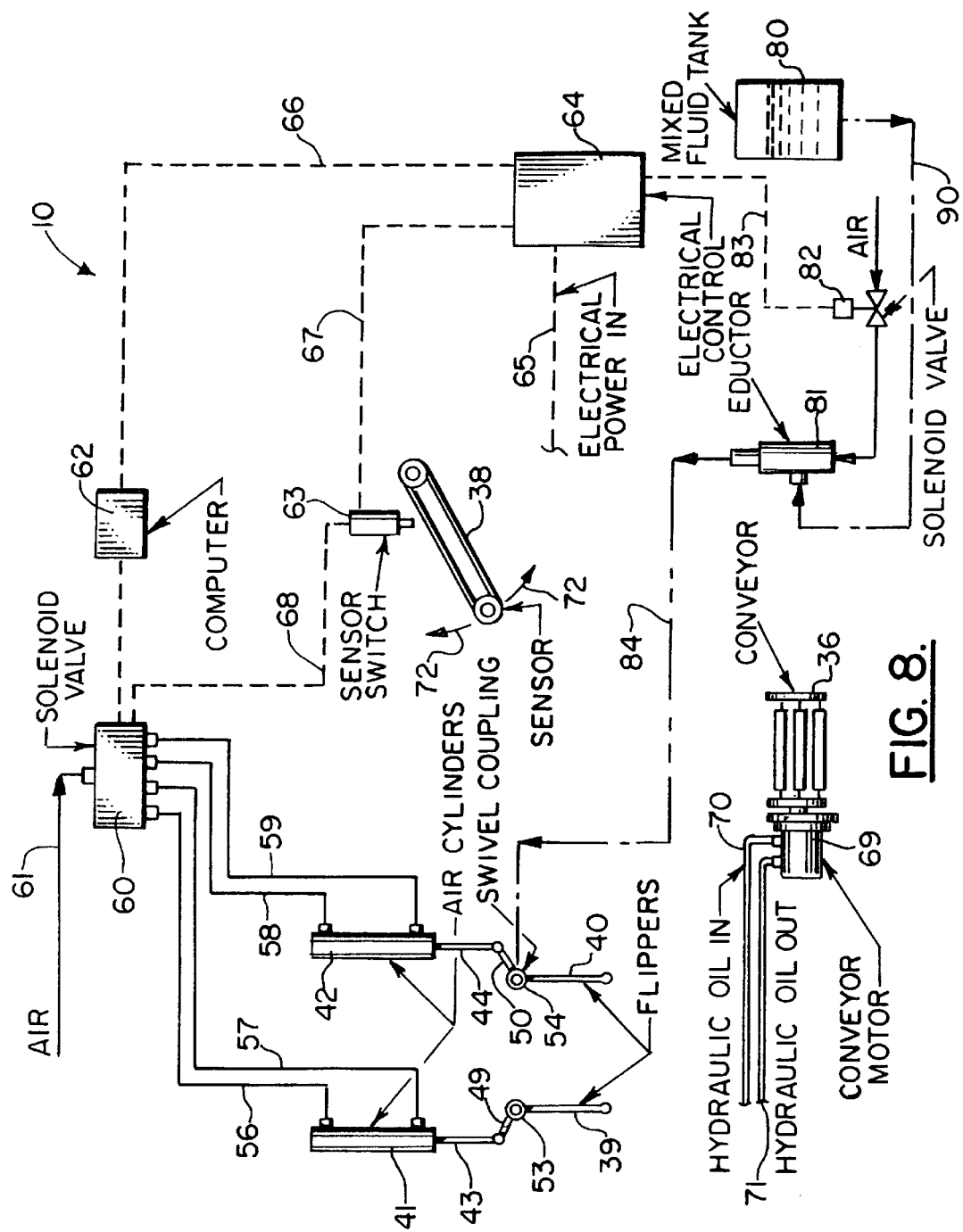
FIG. 8 is a schematic diagram of the preferred embodiment of the apparatus of the present invention.

FIGS. 1–4 show generally the preferred embodiment of the apparatus of the present invention, designated generally by the numeral 10. In FIG. 8, a schematic diagram of the apparatus of the present invention is shown, designated generally by the numeral 10.

Lettuce harvester 10 includes a frame 11 that can move along rows to be harvested. Frame 11 can be self propelled or it can be pulled by a powered mechanical device such as a tractor 20.

Figure 1:
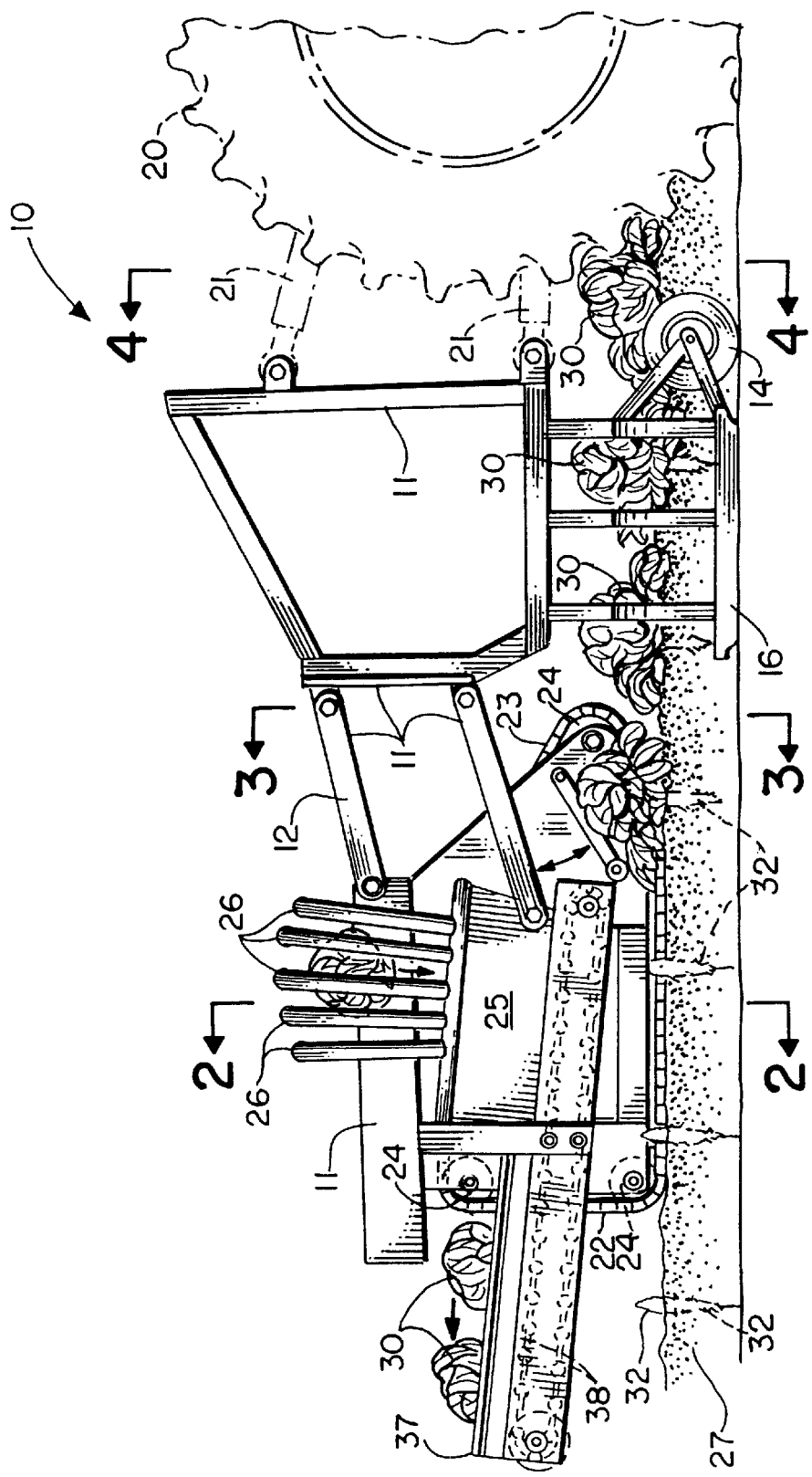
FIG. 1 is a side elevation view of the preferred embodiment of the apparatus of the present invention shown in the harvesting position.
Figure 2:
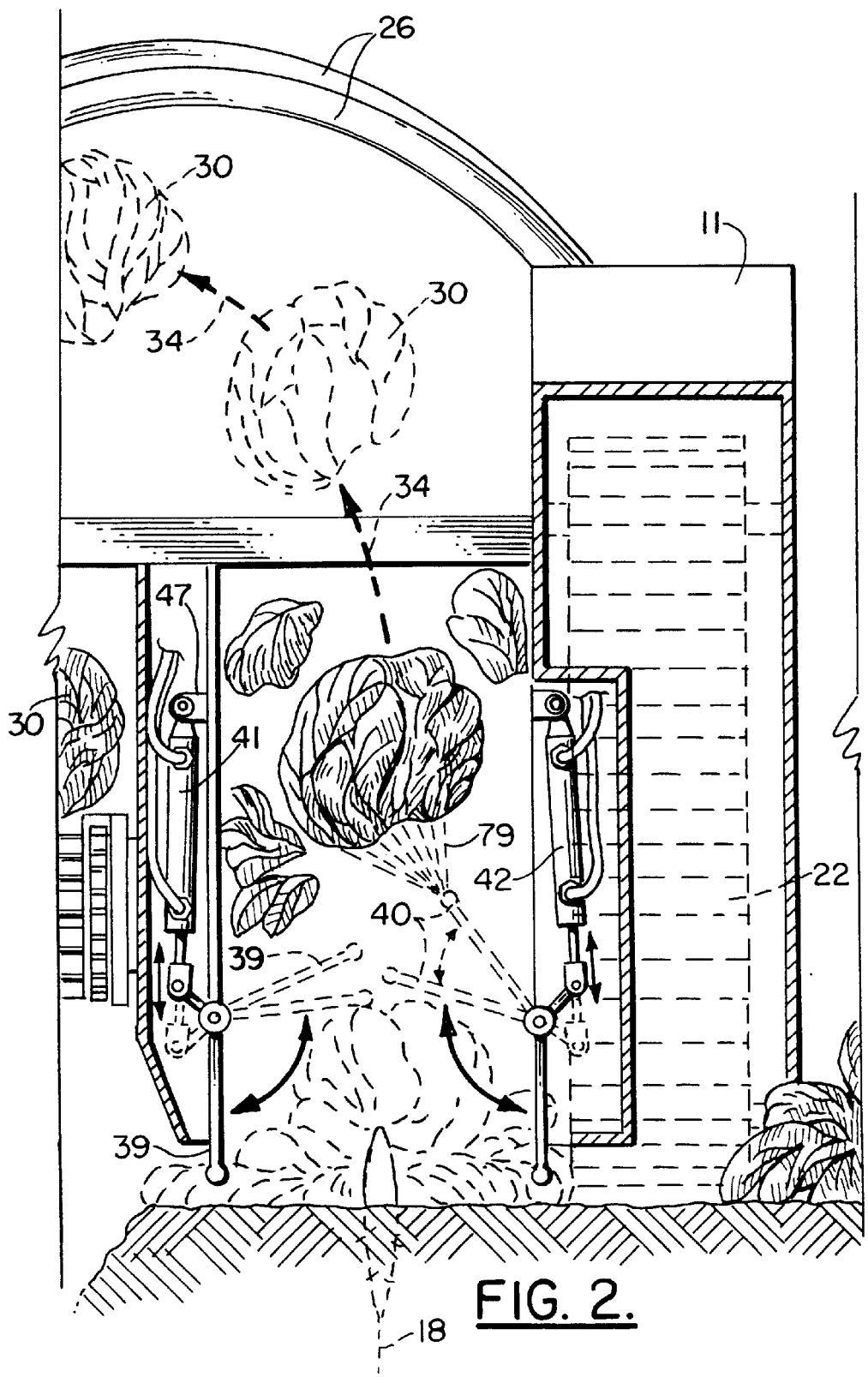
FIG. 2 is a sectional view taken along lines 2—2 of FIG. 1.
Figure 4:
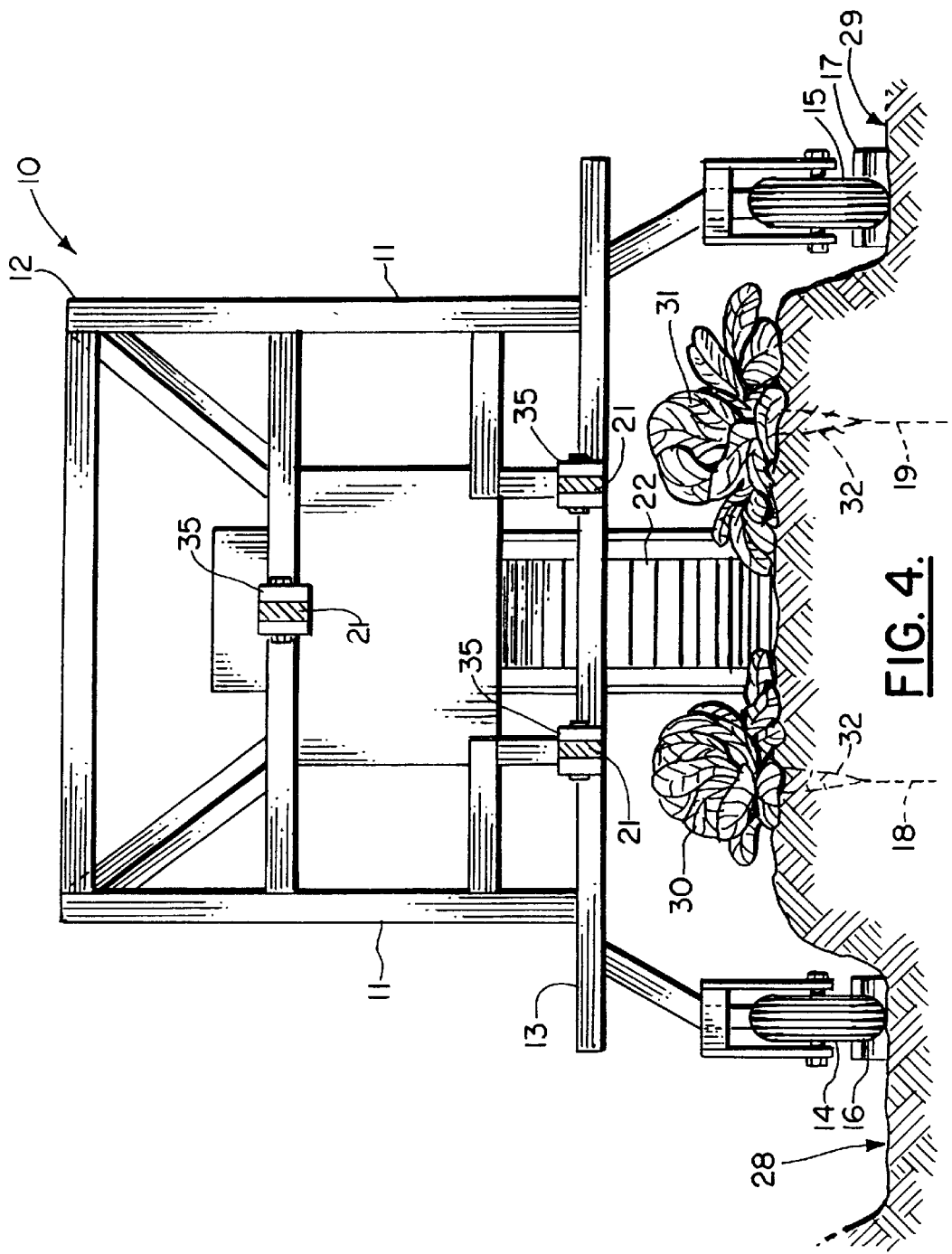
FIG. 4 is a sectional view taken along lines 4—4 of FIG. 1.
Figure 6:
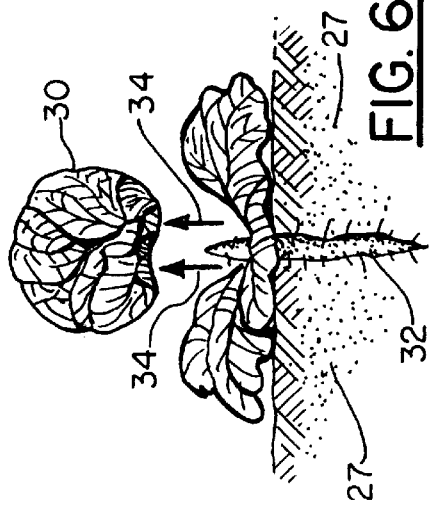
FIG. 6 is a schematic, fragmentary view illustrating part of the method of the present invention.
Figure 9:
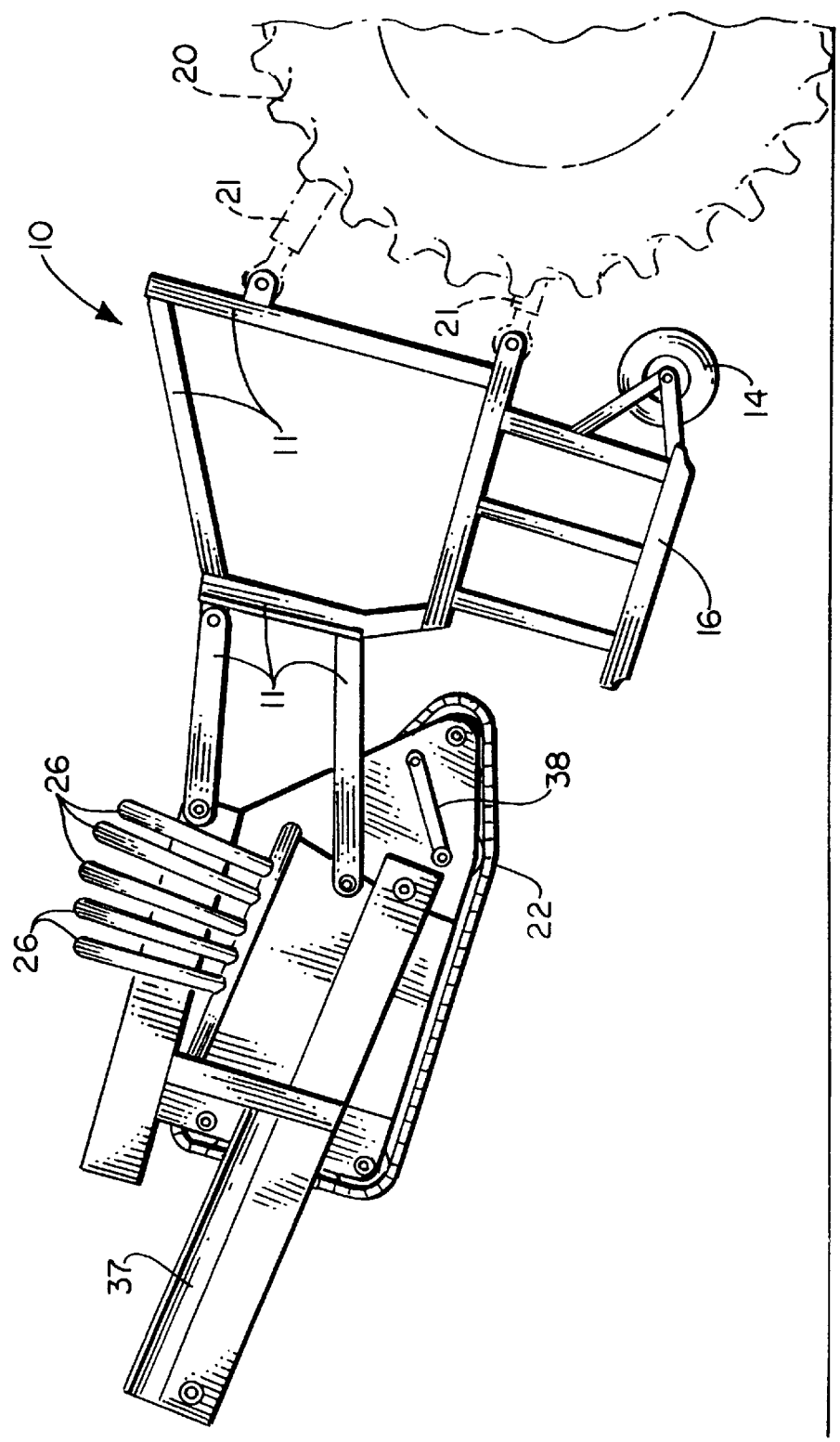
FIG. 9 is an elevation view of the preferred embodiment of the apparatus of the present invention showing the harvester in an elevated, non-harvesting transport position.

The tractor 20 typically provides a hitch 21 such as a commercially available three-point hitch that attaches to frame 11 as shown in FIGS. 1, 4 and 9.

Frame 11 has an upper end portion 12 and a lower end portion 13. The frame 11 is supported by a plurality of ground engaging supports such as wheels 14, 15, skids 16, 17 and central track 22. The wheels 14, 15 include a right wheel 14 that is mounted to frame 11 in front of right skid 16. Similarly, left wheel 15 is mounted to frame 11 in front of left skid 17.

Figure 5:
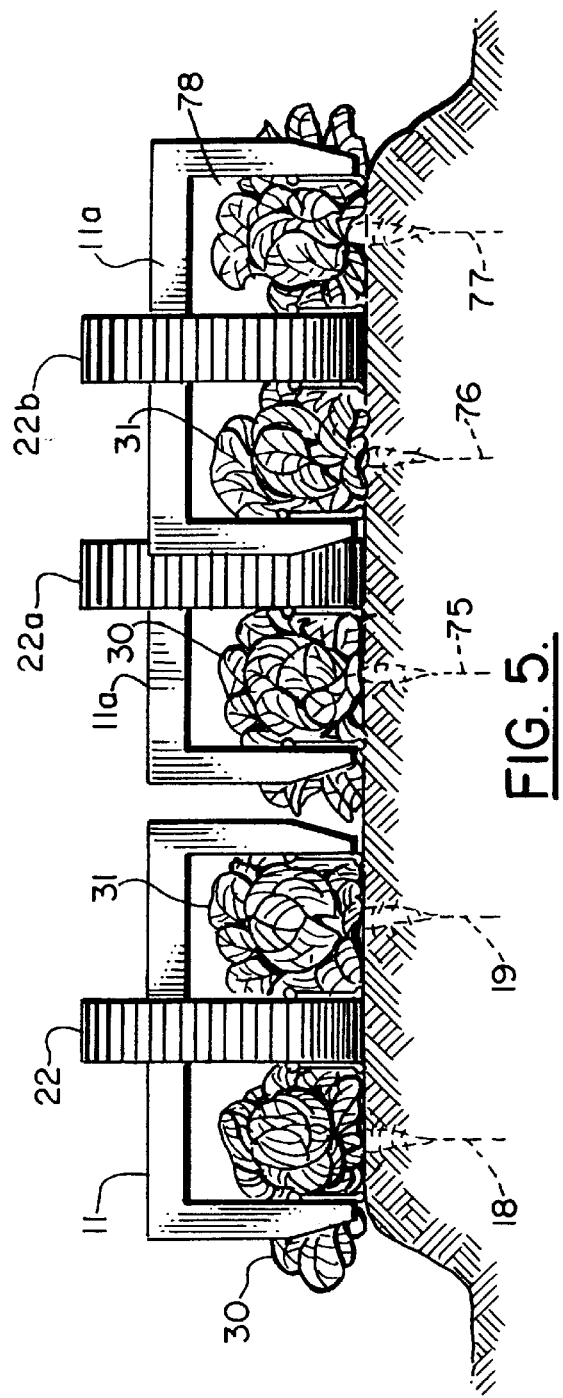
FIG. 5 is a schematic end view illustrating the preferred embodiment of the apparatus of the present invention in both two-row and three-row configurations.

As shown in FIG. 4, the harvester 10 of the present invention is used to harvest a pair of rows of lettuce designated generally by the numerals 18, 19 in FIG. 4, each of the rows 18, 19 having a respective plurality of heads of lettuce 30, 31 to be harvested. However, more than two rows can be harvested (see FIG. 5). In FIG. 5, a schematic illustration shows that the preferred embodiment of the apparatus of the present invention can be used to harvest either two or three rows at a time. The left hand portion of FIG. 5 illustrates schematically the harvesting of two rows 18, 19 wherein frame 11 is provided with a single track 22. The right hand side of FIG. 5 shows a frame 11A that has two tracks, 22A, 22B, for harvesting three rows 75, 76, 77 of lettuce. The third row of lettuce 77 includes a plurality of heads of lettuce to be harvested, each designated by the numeral 78.

The right wheel 14 and right skid 16 travel in a furrow 28 as shown in FIG. 4. The left wheel 15 and left skid 17 travel in a furrow 29 as shown in FIG. 4. Track 22 is as a central support positioned between rows 18, 19 and can be in the form of an endless belt 23 supported by a plurality of support rollers 24 that are mounted on frame 11. Track 22 is preferably an idler track, but it can be driven.

Figure 3:
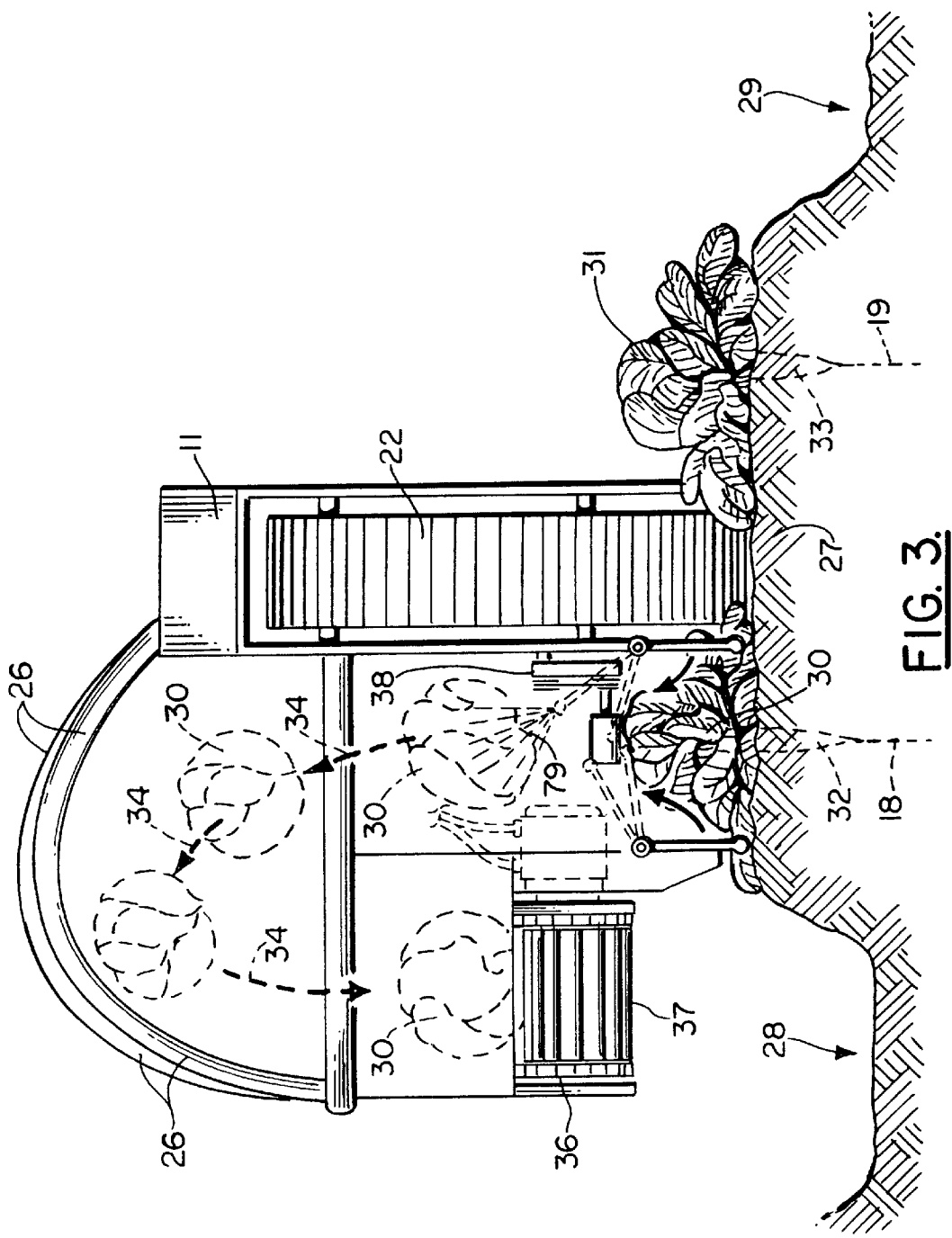
FIG. 3 is a sectional view taken along lines 3—3 of FIG. 1.

During use, a plurality of heads of lettuce 30, 31 are to be harvested from each rows 18, 19. During harvesting, each head of lettuce 30, 31 is separated from its root 32 and stem 33 as shown in FIGS. 2–4 and 6–7. Each head of lettuce 30, 31 is preferably thrust upwardly and laterally (as shown in FIG. 3) by paddles 39, 40 along an arcuate path indicated schematically by arrow 34. At the end of this travel path 34, each head of lettuce 30, 31 enters a hopper 25 having an open bottom. Under the hopper 25 is provided conveyor 36 having endless belt 37. The heads of lettuce 30, 31 that are harvested fall through hopper to conveyor 36. At conveyor 36, lettuce is conveyed to a desired receptacle, trailer, truck, cart, box, or the like. Conveyor 36 can be operated with a hydraulic motor such as the hydraulic motor 69 in FIG. 8. Hydraulic motor 69 is provided with conventional hydraulic fluid flow lines 70, 71 for operating the motor 69.

A deflector 26 can be positioned above each row 18 or 19 of a head of lettuce 30, 31 to be harvested. Deflector 26 extends laterally as shown in FIG. 3 to hopper 25. Deflector 26 can be in the form of a plurality of curved bars 26 as shown in FIGS. 1 and 3. It should be understood that the speed of paddles 39 and 40 which harvest each head of lettuce 30 or 31 can be adjusted by adjusting the speed of operation of cylinders 41, 42. Each head of lettuce 30 or 31 is desirably thrust in an arcuate path 34 that does not cause the harvested head of lettuce 30, 31 to actually strike the deflector 26. However, because of the inconsistency of a product such as a growing head of lettuce, it is possible that a particular head of lettuce 30 or 31 might be thrust slightly higher than the rest of the heads of lettuce 30, 31 and strike deflector 26.

Figure 7:
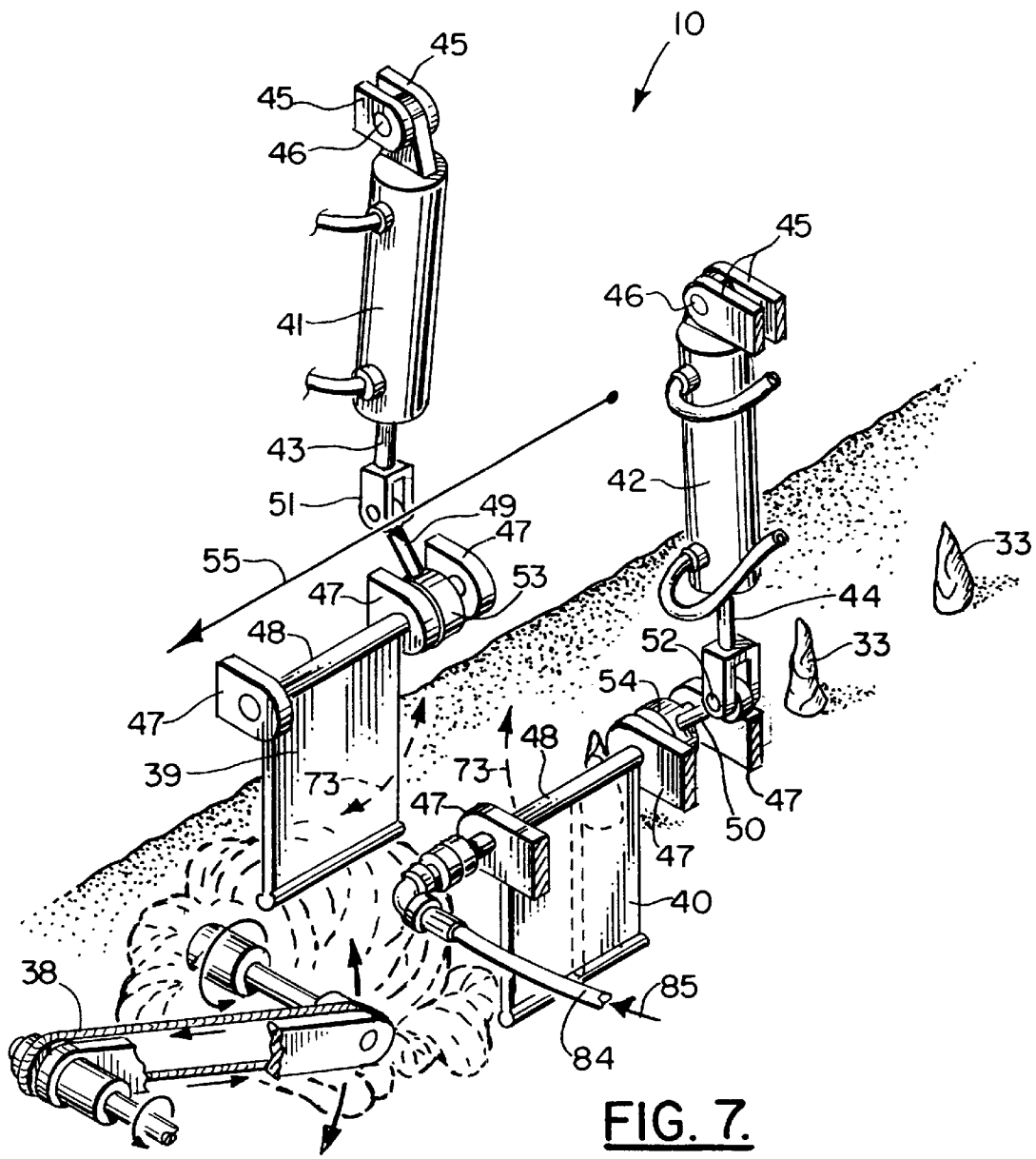
FIG. 7 is a fragmentary, perspective view of the apparatus of the present invention, and illustrating part of the method of the present invention.

The operation of the paddles 39, 40 is shown more particularly in FIGS. 2, 3, 7 and 8. In FIG. 7, the paddles 39, 40 and pneumatic cylinders 40, 41 are shown in a perspective view with frame 11 removed for purposes of clarity. Paddles 39, 40 are movably, preferably pivotally attached to frame 11 using, for example, a plurality of padeyes 47 that are connected (for example, welded) to frame 11.

Each pneumatic cylinder 41, 42 is mounted to frame 11 using, for example, a plurality of padeyes 45 that are connected (for example, welded) to frame 11. Each pneumatic cylinder 41, 42 has a push rod that is attached to an arm that rotates or pivots a paddle. Pneumatic cylinder 41 has push rod 43 that attaches at pinned connection 51 to arm 49. Arm 49 attaches at bearing 53 to horizontal rod 48. Each paddle 39, 40 is rotatably (preferably pivotally) connected to frame 11 at padeyes 47 with horizontal rods 48 as shown in FIG. 7.

A similar arrangement is shown for the second pneumatic cylinder 42. Cylinder 42 has a push rod 44 that is connected at pinned connection 52 to arm 50. Arm 50 attaches at bearing 54 to horizontal rod 48. Paddle 40 is attached to horizontal rod 48 as shown in FIG. 7. Pinned connections 46 can be used to attach the upper end portion of each pneumatic cylinder 41, 42 to padeyes 45 as shown in FIG. 7.

The paddle 40 can be provided with a misting device that injects a liquid or liquid/air mixture into the cavity that remains on the head.of lettuce 30 or 31 after it is separated from stem 33. This liquid or liquid/air mixture can include chlorine, water and/or other chemicals to prevent discoloration in the area of the "wound" resulting from being torn from the stem/root system.

Figure 13:
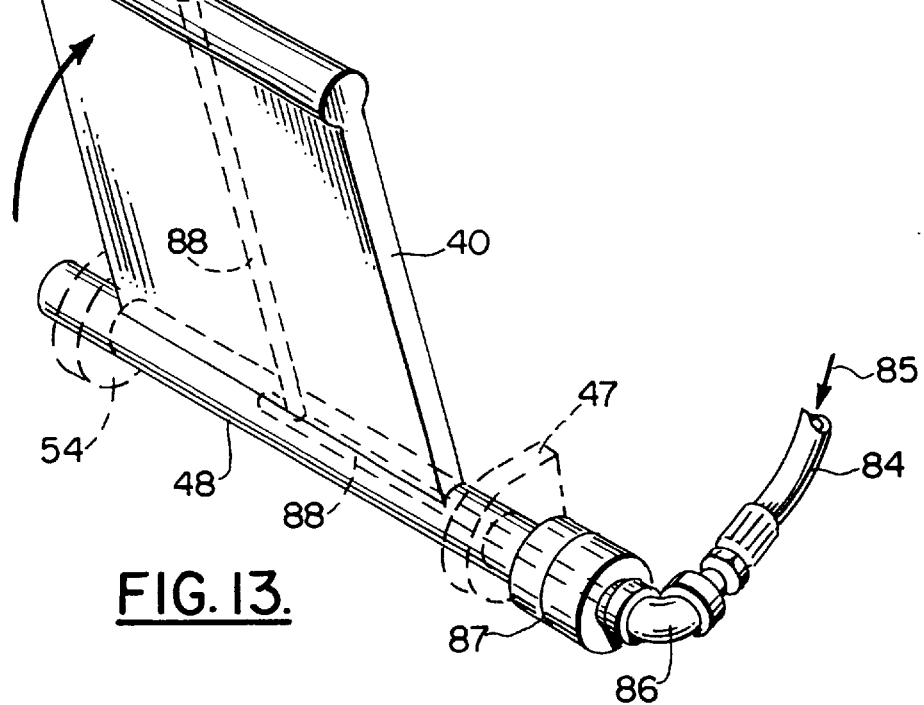
FIG. 13 is a fragmentary, perspective view of the preferred embodiment of the apparatus of the present invention illustrating the paddle and its mister arrangement for thrusting a spray mist at each head of lettuce as it is picked.

In FIGS. 7, 8 and 13, mist 79 is shown being sprayed from outlet 89 at the tip of paddle 40 opposite horizontal rod 48. The misting device includes a mixed fluid tank 80 that supplies a desired mixture of fluid via flow line 90 to eductor 81. Eductor 81 mixes liquid from tank 80 with air that is received from control valve 82. Control valve 82 can be opened or closed to admit a desired volume of air into eductor 81 and thus into flow line 84 that communicates between eductor 81 and swivel coupling 87 (see FIGS. 7 and 13). Control line 83 communicates between electrical control panel 64 and control valve 82. Fluid flow line 84 is shown in FIGS. 7 and 13 communicating with elbow fitting 86 and swivel coupling 87. A flow channel 88 is formed (eg. milled) within the combination of horizontal rod 48 and paddle 40 as shown in FIG. 13. Channel 88 communicates with outlet 89 so that when a mixture of air and fluid or fluid only is transmitted to channel 88 via flow line 84, it is discharged as a mist 79 at outlet 89.

In FIG. 7, arrow 55 schematically indicates the direction of travel of the harvester apparatus 10 during use. As apparatus travels in a forward direction, sensor 38 engages each head of lettuce 30 or 31 to be harvested. Sensor 38 is movably, preferably pivotally attached to frame 11 so that it engages and is deflected away from head of lettuce 38, as indicated schematically by the arrow 72 in FIG. 8.

When the sensor 38 is deflected in the direction of arrow 72, it engages and activates sensor switch 63. Sensor switch 63 is connected via lines 67 and 68 to an electrical control 64, solenoid valve 60 and computer 62. Electrical control 64 communicates with computer 62 via line 66. An electrical power source is provided at electrical power line 65 for powering electrical controls 64. When sensor switch 63 is activated, a timing sequence is initiated using electrical control 64 and computer 62 to operate solenoid valve 60.

Solenoid valve 60 is supplied with air via flow line 61. The valve 60 feeds air to each of the pneumatic cylinders 41, 42 via air lines 56–59 as shown in FIG. 8. In the preferred embodiment, the paddle 40 begins its rotational path upwardly in the direction of arrows 72 before the paddle 39. In this fashion, the paddle 40 first strikes the head of lettuce 30 to be harvested as shown in FIG. 3. A short time (eg. 1/1000 seconds) later, the paddle 39 strikes the head of lettuce 30 or 31. This action causes the head of lettuce 30, 31 to travel upwardly and laterally away from the paddles 39, 40 as indicated by the travel path arrows 34 in FIG. 3.

In FIG. 9, tractor 20 has elevated its three-point hitch 21 to illustrate the transport position of the harvester 10 prior to and after harvesting operations.

Figure 10:
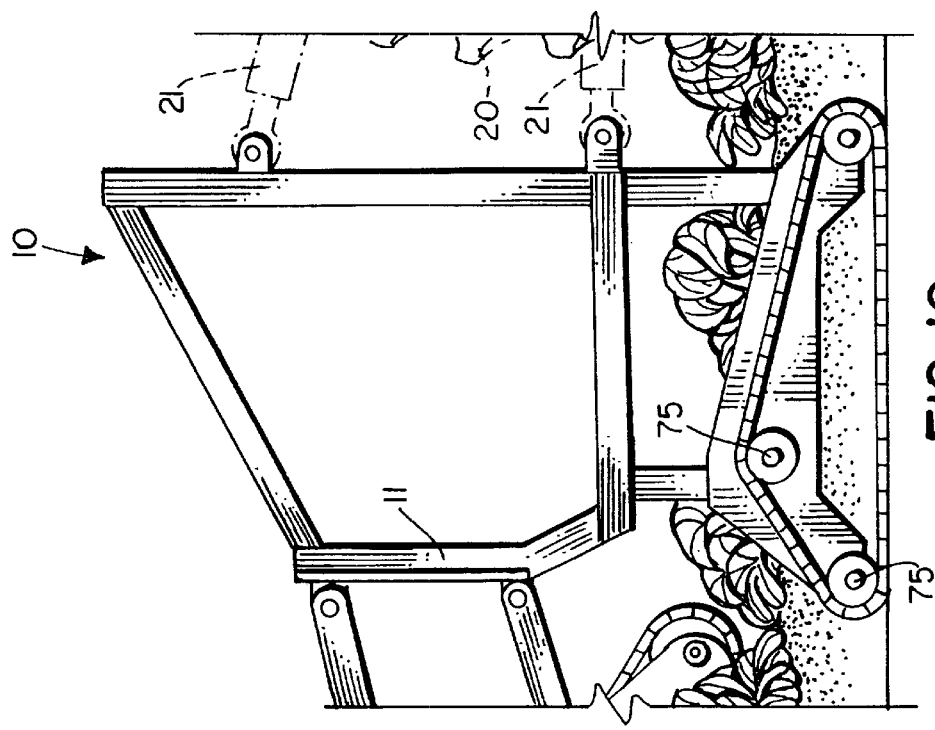
FIG. 10 is an elevation view of the preferred embodiment of the apparatus of the present invention showing an alternate configuration for the harvester ground engaging supports that travel in opposing furrows on sides of the rows of lettuce to be harvested.

In FIG. 10, the wheel 14, 15 and skid 16, 17 arrangement is replaced with an alternate construction that includes an endless track 74 supported by a plurality of rollers 75.

Figure 11:
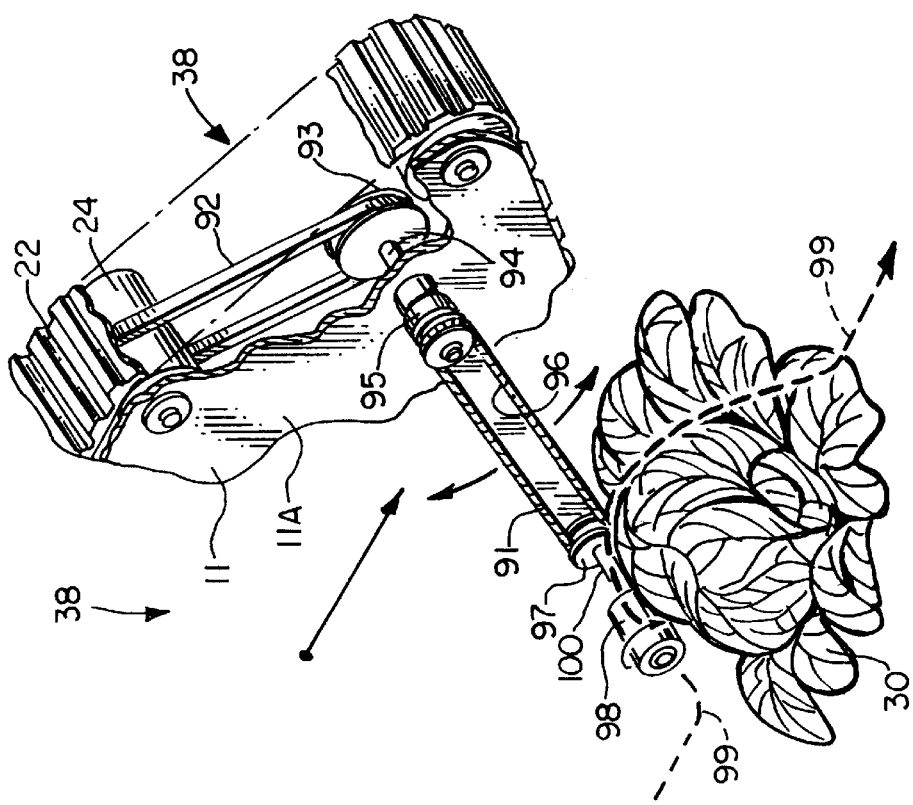
FIG. 11 is a perspective, fragmentary view of the preferred embodiment of the apparatus of the present invention illustrating the sensor.
Figure 12:
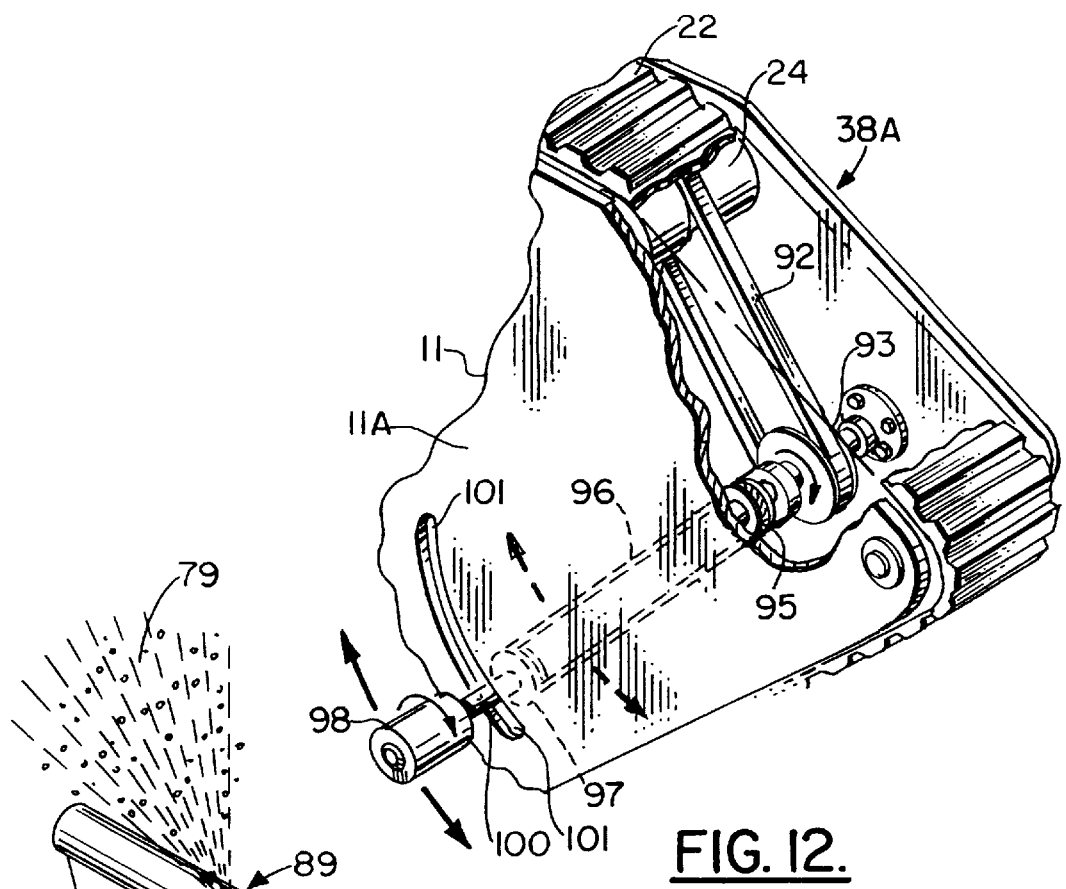
FIG. 12 is a fragmentary, perspective view illustrating an alternate construction for the sensor.

FIGS. 11 and 12 show different arrangements for the sensor 38. In FIG. 11, sensor 38 is partially exposed while in FIG. 12 it is almost totally encased within frame 11. In FIG. 11, sensor 38 has a center arm 91 that is positioned exteriorly of frame 11 in an exposed position. The sensor arm 38 can be belt driven, such as for example driven by one of the rollers 24 that support track 22. In such an arrangement, belt 92 is driven by roller 24. The belt 92 is also supported by sheave 93 that drives shaft 94. FIG. 11, shaft 94 extends externally of frame plate section 11B and supports sheave 95. Arm 91 provides a belt 96 that rotates sheave 97 and roller 98. The roller 98 actually engages a head of lettuce 30 or 31 to be harvested and travels up and over it as indicated schematically by the dotted line 99 in FIG. 11.

In FIG. 12, the only portion of the sensor 38 that extends externally of the plate section 11A is the roller 98. Shaft 100 extends through 101 which is an arcuate slot designed to accommodate movement of arm 91 during use.

PARTS LIST

The following is a list of suitable parts and materials for the various elements of the preferred embodiment of the present invention.

| PART NO. | DESCRIPTION |
| --- | --- |
| 10 | lettuce harvester |
| 11 | frame |
| 11A | frame |
| 11B | frame plate section |
| 12 | upper end portion |
| 13 | lower end portion |
| 14 | right wheel |
| 15 | left wheel |
| 16 | right skid |
| 17 | left skid |
| 18 | lettuce row |
| 19 | lettuce row |
| 20 | tractor |
| 21 | tractor hitch |
| 22 | track |
| 22B | track |
| 23 | endless belt |
| 24 | support roller |
| 25 | hopper |
| 26 | deflector |
| 27 | earth |
| 28 | furrow |
| 29 | furrow |
| 30 | head of lettuce |
| 31 | head of lettuce |
| 32 | root |
| 33 | stem |
| 34 | arrow |
| 35 | attachment |
| 36 | conveyor |
| 37 | endless belt |
| 38 | sensor |
| 38A | sensor |
| 39 | paddle |
| 40 | paddle |
| 41 | pneumatic cylinder |
| 42 | pneumatic cylinder |
| 43 | pushrod |
| 44 | pushrod |
| 45 | padeye |
| 46 | pinned connection |
| 47 | padeye |
| 48 | horizontal rod |
| 49 | arm |
| 50 | arm |
| 51 | pinned connection |
| 52 | pinned connection |
| 53 | bearing |
| 54 | bearing |
| 55 | arrow |
| 56 | air line |
| 57 | air line |
| 58 | air line |
| 59 | air line |
| 60 | solenoid valve |
| 61 | supply air |
| 62 | computer |
| 63 | sensor switch |
| 64 | electrical control |
| 65 | electrical power line |
| 66 | line |
| 67 | line |
| 68 | line |
| 69 | hydraulic motor |
| 70 | oil line |
| 71 | oil line |
| 72 | arrow |
| 73 | arrow |
| 74 | endless track |
| 75 | lettuce row |
| 76 | lettuce row |
| 77 | lettuce row |
| 78 | head of lettuce |
| 79 | mist |
| 80 | mixed fluid tank |
| 81 | eductor |
| 82 | air control valve |
| 83 | control line |
| 84 | fluid flow line |
| 85 | arrow |
| 86 | elbow fitting |
| 87 | swivel coupling |
| 88 | channel |
| 89 | outlet |
| 90 | flow line |
| 91 | sensor arm |
| 92 | beet |
| 93 | sheave |
| 94 | shaft |

-continued

| PART NO. | DESCRIPTION |
|---|---|
| 95 | sheave |
| 96 | belt |
| 97 | sheave |
| 98 | roller |
| 99 | dotted line |
| 100 | shaft |
| 101 | slot |

The foregoing embodiments are presented by way of example only; the scope of the present invention is to be limited only by the following claims.

What is claimed is:

1. A method of harvesting mature heads of lettuce comprising;
   a) providing a movable chassis with a plurality of ground engaging supports and a pair of opposed paddles movably supported upon the chassis;
   b) positioning the chassis next to two rows of lettuce to be harvested, wherein one of the ground engaging supports is positioned in between the two lettuce rows;
   c) advancing the chassis along the two rows of lettuce;
   d) automatically operating the paddles at intervals, when the paddles are next to a head of lettuce to be harvested, and wherein the paddles move with a speed sufficient to elevate the head of lettuce above the soil that it grows in, thereby separating the head of lettuce from its stem and root system.

2. The method of claim 1 wherein some of the ground engaging supports are positioned on opposing sides of the two rows of lettuce.

3. The method of claim 1 wherein in step "d" the head of lettuce is separated from its stem and root.

4. The method of claim 1 wherein the paddles in step "d" are pneumatically driven.

5. The method of claim 1 wherein the paddles in step "d" are pivotally moved relative to the chassis.

6. The method of claim 2 wherein in step "d" the head of lettuce is separated from its stem and root and thrust upwardly a distance of at least 15 inches.

7. A method of harvesting a row of mature heads of lettuce comprising the steps of;
   a) providing a movable chassis with a plurality of ground engaging supports and a pair of opposed lettuce harvesting paddles movably supported upon the chassis, the paddles being positioned during use on opposing sides of a row of lettuce to be harvested;
   b) positioning the chassis next to the row of lettuce to be harvested, wherein ground engaging supports are positioned next to the lettuce row;
   c) advancing the chassis along the row of lettuce;
   d) automatically operating the paddles at intervals when the paddles are next to a head of lettuce to be harvested, and wherein the paddles move between starting and ending positions that bring the paddles into contact with a head of lettuce and with a speed sufficient to elevate the head of lettuce above the soil that it grows in and to separate the head of lettuce from its stem and root system.

8. The method of claim 7 wherein some of the ground engaging supports are positioned on opposing sides of the two rows of lettuce.

9. The method of claim 7 wherein in step "d" the head of lettuce is separated from its stem and root.

10. The method of claim 7 wherein the paddles in step "d" are pneumatically driven.

11. The method of claim 7 wherein the paddles in step "d" are pivotally moved relative to the chassis.

12. The method of claim 8 wherein in step "d" the head of lettuce is separated from its stem and root and thrust upwardly a distance of at least 15 inches.

13. The method of claim 7 further comprising the step of misting the head of lettuce with a desired liquid spray.

14. The method of claim 7 further comprising the step of misting the head of lettuce with a desired liquid spray after it is picked.

15. A method of harvesting a row of mature heads of lettuce comprising the steps of;
   a) providing a movable chassis with a plurality of ground engaging supports and a pair of opposed lettuce harvesting lettuce picking members movably supported upon the chassis, the lettuce picking members being positioned during use on opposing sides of a row of lettuce to be harvested;
   b) positioning the chassis next to the row of lettuce to be harvested, wherein the ground engaging supports are positioned next to the lettuce row;
   c) advancing the chassis along the row of lettuce;
   d) automatically operating the lettuce picking members at intervals when the lettuce picking members are located at a position next to a head of lettuce to be harvested, and wherein the lettuce picking members move between starting and ending positions that bring the lettuce picking members into contact with a head of lettuce and with a speed sufficient to elevate the head of lettuce above the soil that it grows in, and to separate the head of lettuce from its stem and root system.

16. A method of harvesting a row of mature head of lettuce, comprising the steps of;
   a) providing a harvester having a movable chassis that is configured to travel along the row of lettuce to be harvested, the chassis having one or more lettuce picking members;
   b) advancing the chassis along the row of lettuce;
   c) automatically operating the lettuce picking members at intervals when the lettuce picking members are located at a position next to a head of lettuce to be harvested, and wherein the lettuce picking members move between starting and ending positions that bring the lettuce picking members into contact with a head of lettuce and with a speed sufficient to elevate the head of lettuce above the soil that it grows in, and to separate the head of lettuce from its stem and root system.

17. The method of claim 16 wherein the chassis has a plurality of ground engaging supports positioned on opposing sides of the row of lettuce.

18. The method of claim 16 wherein in step "d" the head of lettuce is separated from its stem and root.

19. The method of claim 16 wherein the paddles in step "d" are pneumatically driven.

20. The method of claim 16 wherein the lettuce picking members in step "d" are pivotally moved relative to the chassis.

21. The method of claim 16 wherein in step "c" the head of lettuce is separated from its stem and root and thrust upwardly a distance of at least 15 inches.

22. The method of claim 16 further comprising the step of misting the head of lettuce with a desired liquid spray.

23. The method of claim 16 further comprising the step of misting the head of lettuce with a desired liquid spray after it is picked.

* * * * *